United States Patent
Kato et al.

(10) Patent No.: US 6,922,711 B2
(45) Date of Patent: Jul. 26, 2005

(54) APPROXIMATE CALCULATOR FOR NON-LINEAR FUNCTION AND MAP DECODER USING SAME

(75) Inventors: Koji Kato, Nagoya (JP); Takayuki Aono, Toyoake (JP)

(73) Assignee: Denso Corporation, Kariya (JP)

( * ) Notice: Subject to any disclaimer, the term of this patent is extended or adjusted under 35 U.S.C. 154(b) by 561 days.

(21) Appl. No.: 10/057,654

(22) Filed: Jan. 23, 2002

(65) Prior Publication Data

US 2002/0129072 A1 Sep. 12, 2002

(30) Foreign Application Priority Data

Jan. 23, 2001 (JP) .................................... 2001-014582

(51) Int. Cl.[7] .............................................. G06F 1/02
(52) U.S. Cl. ................................................. 708/277
(58) Field of Search ................. 708/270, 277, 708/517

(56) References Cited

U.S. PATENT DOCUMENTS

| | | | |
|---|---|---|---|
| 6,289,367 B1 * | 9/2001 | Allred | 708/277 |
| 6,711,596 B1 * | 3/2004 | Coleman | 708/277 |
| 6,757,701 B2 * | 6/2004 | Sivan et al. | 708/277 |

* cited by examiner

*Primary Examiner*—Tan V. Mai
(74) *Attorney, Agent, or Firm*—Harness, Dickey & Pierce, PLC

(57) ABSTRACT

A calculator calculates an approximate value of a function $Y=\log(1+e^{-x})$ using input data x. In the calculator, a decoder outputs m-bit data that represents a value corresponding to the slope of a straight line, and further outputs intercept data of the straight line. The straight line interpolates the function $Y=\log(1+e^{-x})$ for an interval that includes the input data x as an X-value, and has a slope of $-2^n$. The intercept data represents Y-intercept of the straight line. A shifter shifts the input data x by $|n|$ bits based on the m-bit data, and provides the resultant value as first term data. An adder generates the sum of the first term data and the intercept data, and outputs the generated sum as an approximate value of the function $\log Y=(1+e^{-x})$

6 Claims, 7 Drawing Sheets

----- STRAIGHT LINES OF SLOPE $\pm 2^n$
——— NON-LINEAR FUNCTION (ORIGINAL)
——— APPROXIMATION

— $y = \log(1+e^{-x})$
— APPROXIMATION
------ STRAIGHT LINES OF SLOPE $-2^n$

------ TANGENT LINES OF SLOPE $\pm 2^n$
— NON-LINEAR FUNCTION (ORIGINAL)
— APPROXIMATION

— NON-LINEAR FUNCTION (ORIGINAL)
— APPROXIMATION
• SAMPLING POINTS

APPROXIMATE CALCULATOR FOR NON-LINEAR FUNCTION AND MAP DECODER USING SAME

CROSS REFERENCE TO RELATED APPLICATION

The present application is based on and incorporates herein by reference Japanese Patent Application No. 2001-14582 filed on Jan. 23, 2001.

BACKGROUND OF THE INVENTION

1. Field of the Invention

The present invention relates to an approximate calculator for a non-linear function, an approximate calculator for a function log $(1+e^{-x})$ an approximate calculator for a function log $(e^a+e^b)$ and a MAP decoder using the same.

2. Related Art

A turbo decoder for decoding a turbo code is proposed. The turbo code includes parallel concatenated convolutional codes with interleaving. The turbo decoder receives and decodes the turbo code while correcting errors. Referring to FIG. 7, the turbo decoder includes two soft-output decoders 101, 102, two interleavers 103, 104, a deinterleaver 105, and a hard decision block 106. The soft-output decoders 101, 102 perform decoding utilizing MAP (Maximum A Posteriori) algorithm as follows.

Referring to FIG. 8, a probability pdf that a bit is "0" and a probability pdf that a bit "1" are calculated for all bits of the received data X(t) using a probability density function of the received data at step 201. Next, probabilities (state transition probabilities) γ are calculated for all branches of a trellis at step 202. At step 203, probabilities α (state probabilities) are calculated by forward iterations for all states and for all trellis levels (i.e., all bits of the received data). At step 204, the probabilities (state probabilities) β are calculated by backward iterations for all states and for all trellis levels.

Next, Information symbol likelihood λ is calculated for all trellis levels using the probabilities α, β. A priori likelihood (LDK) is calculated for all trellis levels based on information symbol likelihood λ at step 206, and it is converted to a priori probabilities corresponding to the respective states and fed back to step 202. At step 207, hard decision is made based on information symbol likelihood λ so that the received data is decoded.

This MAP decoding process may be implemented by a calculator shown in FIG. 9. That is, the probabilities pdf, the probabilities α, β, γ the information symbol likelihood λ, the a priori likelihood LDK and a priori probabilities prb can be computed by using the respective formulas shown in FIG. 9. However, it is impractical to implement the calculator by hardware or software, because the number of bits required for representing intermediate results is large.

Then it is proposed that one of various algorithms is employed so that the MAP decoding calculator is implemented by a smaller circuit. For example, Log-BCJR algorithm (S. Bebedetto et. al, "Soft-output decoding of parallel concatenated convolutional codes", ICC 96) is known as an algorithm that enables alleviation of computational complexity so that the precision of decoding is maintained. According to Log-BCJR algorithm, the operations corresponding to the respective blocks shown in FIG. 9 are executed with respect to exponent parts, that is, the operations are executed in the log-domain.

Specifically, log pdf (i.e., $-(x-1)^2/2\sigma$) is calculated using received data x (σ represents variance). Log γ (i.e., log (pdf.pdf.prb)) is calculated utilizing a property of logarithms (log (pdf.pdf.prb)=log pdf+log pdf+log pdf). Log λ

$$\left(\text{i.e., } \log \frac{\sum (\alpha \cdot \beta \cdot \gamma)}{\sum (\alpha \cdot \beta \cdot \gamma)}\right)$$

is also calculated utilizing a property of logarithms $$\left(\log \frac{\sum (\alpha \cdot \beta \cdot \gamma)}{\sum (\alpha \cdot \beta \cdot \gamma)} = \log \sum (\alpha \cdot \beta \cdot \gamma) - \log \sum (\alpha \cdot \beta \cdot \gamma)\right).$$

On the other hand, each of the probabilities α obtained by using a formula $\alpha_1 \cdot \gamma_1 + \alpha_2 \cdot \gamma_2$ where $\alpha_1$, $\alpha_2$ represent the previous states in the trellis and $\gamma_1$, $\gamma_2$ represent the branches of the respective previous states $\alpha_1$, $\alpha_2$. Therefore, putting $\alpha_1 \cdot \gamma_1 = e^a$ and $\alpha_2 \cdot \gamma_2 = e^b$, log $(e^a+e^b)$ should be calculated for obtaining the value of log α. Similarly, each of the probabilities β is obtained by using a formula $\beta_1 \cdot \gamma_3 + \beta_2 \cdot \gamma_4$ where $\beta_1$, $\beta_2$ represent the previous states in the trellis and $\gamma_3$, $\gamma_4$ represent the branches of the respective previous state $\beta_1$, $\beta_2$. Therefore, putting $\beta_1 \cdot \gamma_3 = e^a$ and $\beta_2 \cdot \gamma_4 = e^b$, log $(e^a+e^b)$ should be calculated for obtaining the value of log β.

When inequality a>b is satisfied, log $(e^a+e^b)$ equals log $e^a(1+e^{b-a})$ and therefore equals "a+log $(1+e^{b-a})$". When inequality b>a is satisfied, log $(e^a+e^b)$ equals log $e^b(1+e^{a-b})$ and therefore equals "b+log $(1+e^{a-b})$". Accordingly, log $(e^a+e^b)$ is represented by the following formula:

$$\log (e^a+e^b) = \max (a, b) + \log (1+e^{-|a-b|}) \quad (1)$$

It is proposed that the second term log $(1+e^{-|a-b|})$ of formula (1) is obtained by table lookup (NAGATA et al., "VLSI Implementation and Evaluation of W-CDMA Turbo Decoder", B-5-26, p. 411, 2000, Institute of Electronics, Information and Communication Engineers). In this case, formula (1) is calculated as follows.

Referring to FIG. 10, a subtracter 301 receives input data a, b, and outputs the difference (a−b) between the input data a and b to a selector 302 and a table lookup block 303. The selector 302 further receives the input data a, b, and selects the larger one max (a, b) from the input data a and b based on the sign of the difference (a−b). The selector 302 outputs the selected larger one max (a, b) to an adder 304. The table lookup block 303 retrieves a value of log $(1+e^{-|a-b|})$ from a lookup table based on the value of the difference (a−b), and outputs it to the adder 304. The adder 304 generates the sum of the values of the larger one max (a, b) and log $(1+e^{-|a-b|})$, and outputs the generated sum as output y.

Thus log $(e^a+e^b)$ can be calculated using the lookup table by a calculator shown in FIG. 10. However, in this case, the lookup table should include values of log $(1+e^{-|a-b|})$ corresponding to relatively many sampling points in order to maintain the precision of decoding. Further, putting 1dk=x, log $(1+e^{-x})$ should be calculated for obtaining the value of log prb. When an approximate value of log $(1+e^{-x})$ is calculated using a lookup table, the lookup table should include values of log $(1+e^{-x})$ corresponding to relatively many sampling points in order to maintain the precision of decoding. Therefore, the scale of a circuit which implements the calculator that generates an approximate value of log $(1+e^{-|a-b|})$ or log $(1+e^{-|a-b|})$ using a lookup table may be relatively large, and computation may be relatively complex.

This problem is not limited to the case of log $(1+e^{-|a-b|})$ or log $(1+e^{-x})$. When the value of an arbitrary non-linear function is obtained from a lookup table, the value of the non-linear function at a sampling point is used as the value of all the points belonging to the interval between the sampling point and the following sampling point as shown in FIG. 11. Therefore the lookup table should include values corresponding to relatively many sampling points in order to provide an approximate value sufficiently close to the actual value. However, a circuit that implements a calculator that includes a large lookup table may be relatively large-scale.

Then it is proposed that the non-linear function between two consecutive sampling points is linear-interpolated for compensating the insufficiency of the number of the sampling points. However, the calculator should perform division and multiplication for obtaining an approximate value in this case, because the slopes of straight lines that interpolate the non-linear function are unrestricted. Therefore, computation is complex, and the scale of a circuit that implements the calculator is relatively large in this case. Thus, in the case that the value of a non-linear function is digitally calculated using a lookup table that includes values at sampling points, the problems that computation is relatively complex and/or the scale of a calculator circuit is relatively large arise as a rule.

SUMMARY OF THE INVENTION

It is an object of the present invention to provide a calculator which calculates an approximate value of a non-linear function using input data without performing complex calculation and can be implemented by a relatively small circuit.

It is another object of the present invention to provide a calculator which calculates an approximate value of a function log $(1+e^{-x})$ using input data x without performing complex calculation and can be implemented-by a relatively small circuit.

It is a further object of the present invention to provide a calculator which calculates an approximate value of a function log $(1+e^{-|a-b|})$ using input data a, b without performing complex calculation and can be implemented by a relatively small circuit.

An approximate calculator according to the present invention includes decoder means, shifter means, and approximation output means. The decoder means outputs m-bit data (m is a natural number) that represents a value corresponding to the slope of a straight line based on the input data, and further outputs intercept data of the straight line based on the input data. The straight line interpolates a non-linear function for an interval that includes the value of the input data as one value of one of coordinates, and has a slope of $2^n$ (n is an integer). The intercept data represents the intercept of the straight line. The shifter means shifts the input data by |n| bits based on the m-bit data, and outputs the resultant data as first term data. The approximation output means generates and outputs an approximate value of the non-linear function based on the first term data and the intercept data.

The present calculator may be incorporated in a MAP decoder for recursively calculating forward state probabilities of a trellis and backward state probabilities of the trellis.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
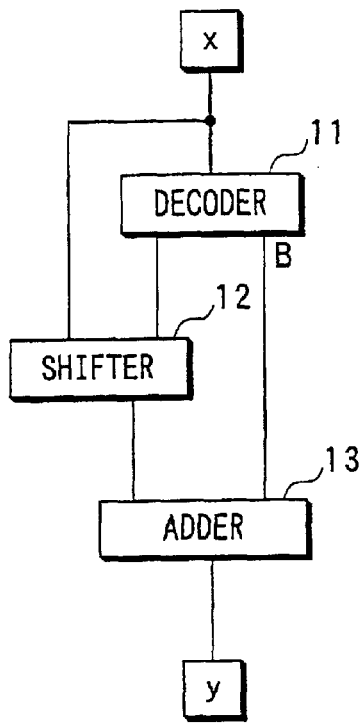
FIG. 1 is a block diagram showing an approximate calculator for a non-linear function according to the present invention.
Figure 2:
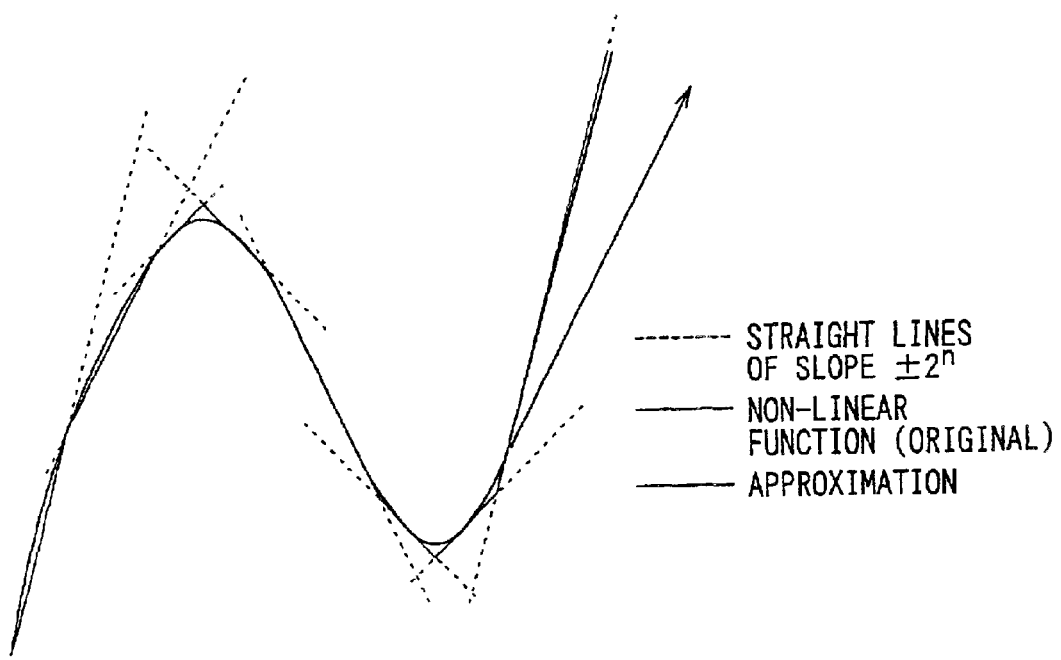
FIG. 2 is graph representation showing how a non-linear function is linear-interpolated according to a first embodiment of the present invention.

Referring to FIG. 1, a calculator according to a first embodiment of the present invention receives input data x, and generates an approximate value y of a non-linear function using the input data x. The calculator includes a decoder 11, a shifter 12 and an adder 13. The non-linear function is linear-interpolated interval by interval as shown in FIG. 2. Specifically, straight lines Y=A·X+B each of which has a slope of $\pm 2^n$ (n is an integer) are selected. The slopes of the selected straight lines are, for example, 4, 2, 1, 0.5, 0.25 and the like.

The Y-intercept B of each of the selected straight line is determined so that the error based on the differences between the approximate values y and the actual values $y_a$ at sampling points is minimized. Therefore, if sufficiently many points are selected as the sampling points, an approximate value that is sufficiently close to the actual value can be obtained by using the selected straight lines. The entire non-linear function is interpolated by a polygonal line that includes segments of the respective straight lines and further includes as vertices the intersections corresponding to the respective pairs of the adjacent straight lines.

Returning to FIG. 1, the decoder 11 receives the input data x, and retrieves, from a lookup table, m-bit data (m is a natural number) that represents a value corresponding to the slope $A=\pm 2^n$ of the straight line which interpolates an interval that includes the value of x as an X-value. Further the decoder 11 retrieves, from the lookup table, intercept data that represents the Y-intercept B of the straight line. The decoder 11 outputs the retrieved m-bit data to the shifter 12, and the retrieved intercept data to the adder 13. The shifter 12 further receives the input data x, and shifts it by |n| bits rightward or leftward based on the sign and the value of the m-bit data. Thus data that represents the value of $2^n \cdot x$ is generated and outputted to the adder 13. The adder 13 generates the sum of the data A·x and the intercept data B, and outputs the generated sum as output y.

Figure 3:
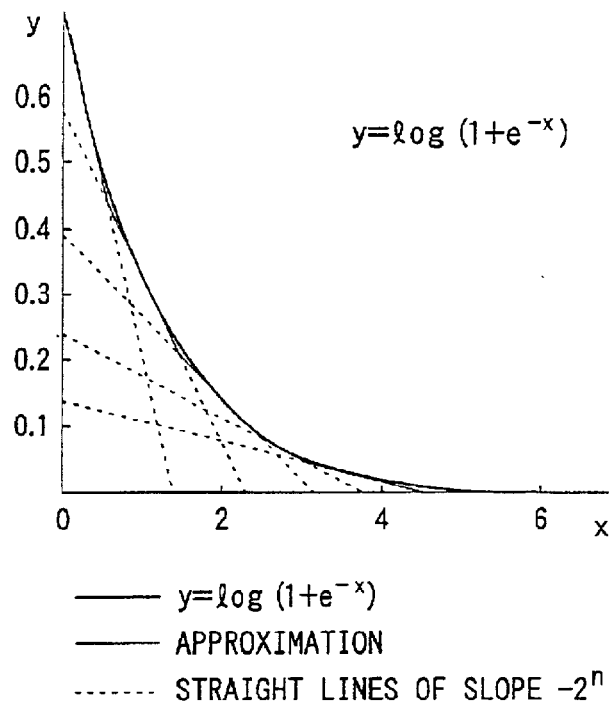
FIG. 3 is graph representation showing how a non-linear function Y=log $(1+e^{-x})$ is linear-interpolated according to the first embodiment.

For example, a non-linear function Y=log (1+e$^{-x}$) is linear-interpolated as shown in FIG. 3 according to the present embodiment. That is, straight lines Y=A·X+B that have slopes of −0.5, −0.25, −0.125, −0.0625, −0.03125 and the like are selected, and the Y-intercept of each of the straight lines are determined so that the error based on the differences between the approximate values y and the actual values y$_a$ at sampling points is minimized. The entire non-linear function is interpolated by a polygonal line that includes segments of the respective straight lines and further includes as vertices the intersections corresponding to the respective pairs of the adjacent straight lines.

The calculator shown in FIG. 1 can calculate an approximate value of the function Y=log (1+e$^{-x}$) by the above linear interpolation. However, the slope of each of the straight lines that interpolate the function Y=log (1+e$^{-x}$) is represented as −2$^n$ (n is an integer) in this case. Therefore a subtracter should be employed instead of the adder 13. The subtracter receives the result 2$^n$·x of bit shift from the shifter 12, and subtracts it from the intercept data B. Thus an approximate value y of the function Y=log (1+e$^{-x}$) is obtained.

According to the present embodiment, the number of straight lines required for interpolating the entire non-linear function is relatively small, and the slopes of the straight lines are limited to ±2$^n$. Since the multiplication using a value of 2$^n$ as a multiplier can be performed by bit shift, computation is not complex and the present calculator can be implemented by a relatively small circuit.

(Second Embodiment)

Figure 7:
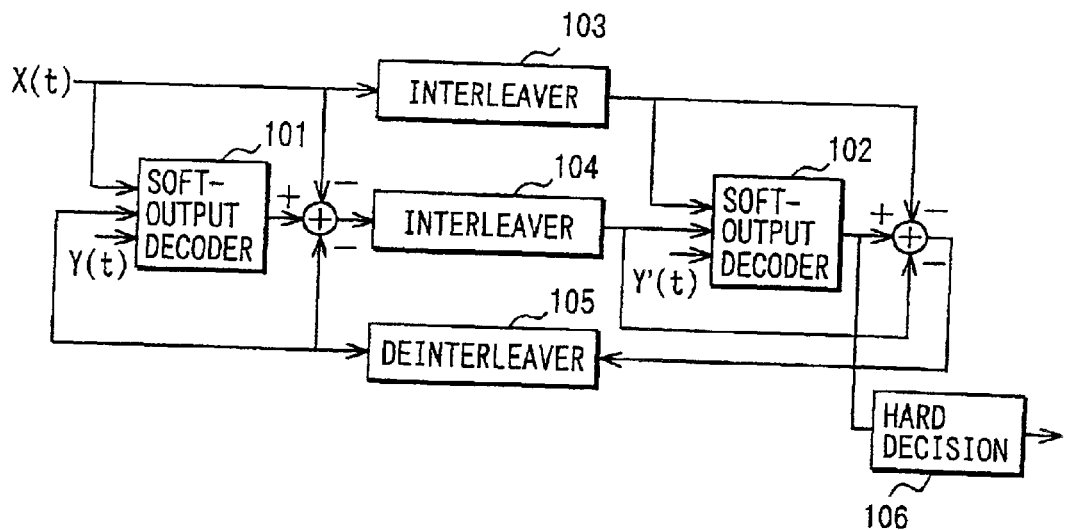
FIG. 7 is a block diagram showing a turbo decoder according to related art.
Figure 8:
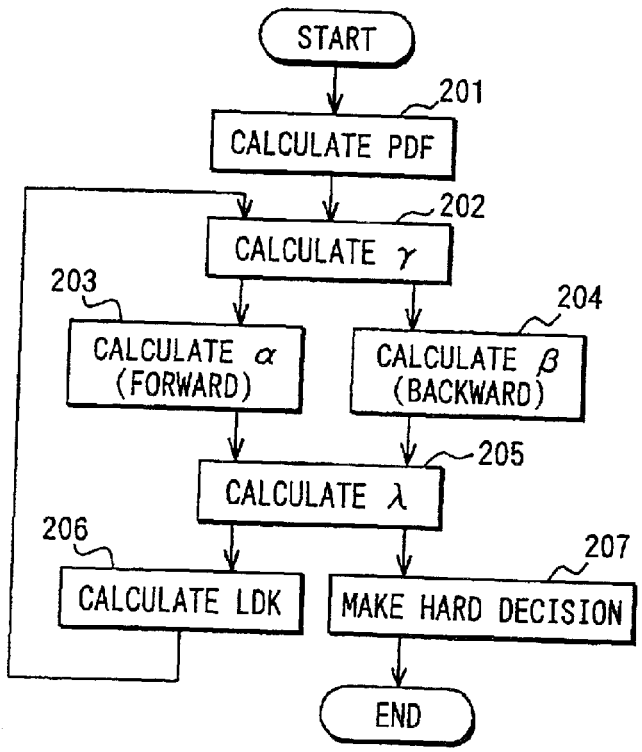
FIG. 8 is a flowchart of a MAP decoding process executed by soft-output decoders of the turbo decoder according to related art.
Figure 9:
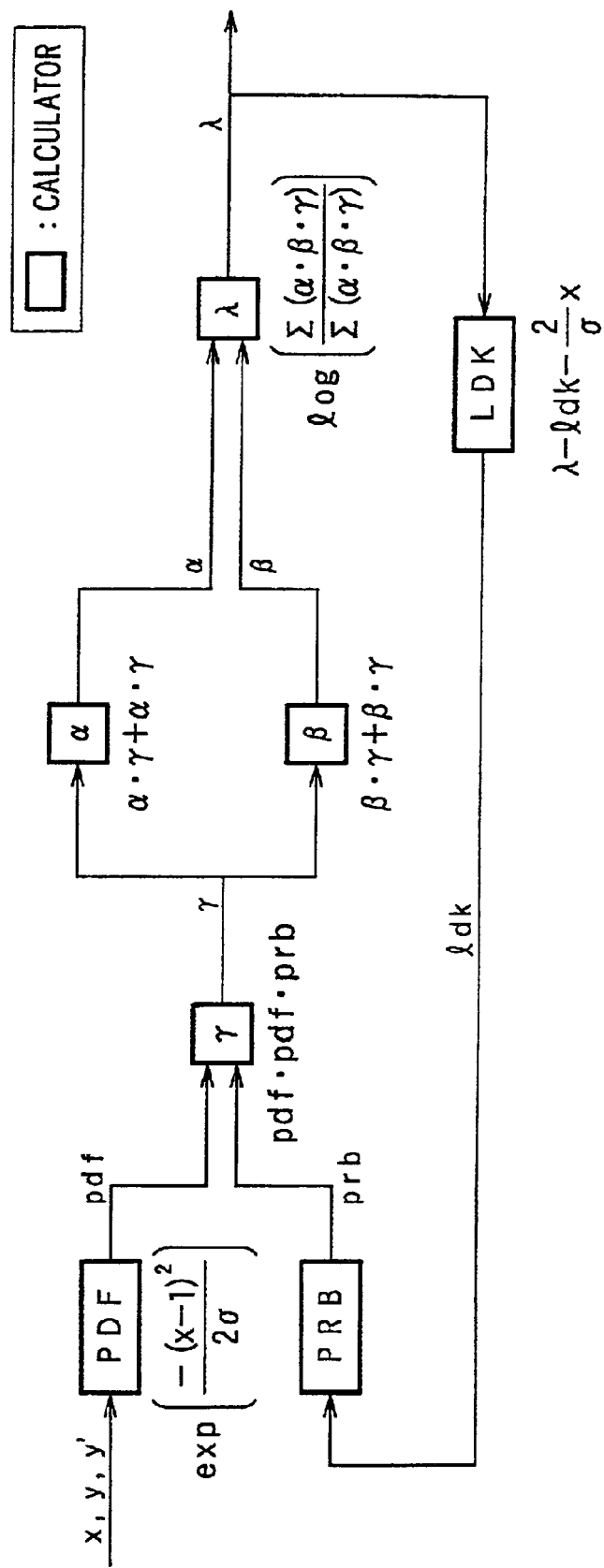
FIG. 9 is a block diagram showing a calculator for executing the MAP decoding process of FIG. 8.
Figure 10:
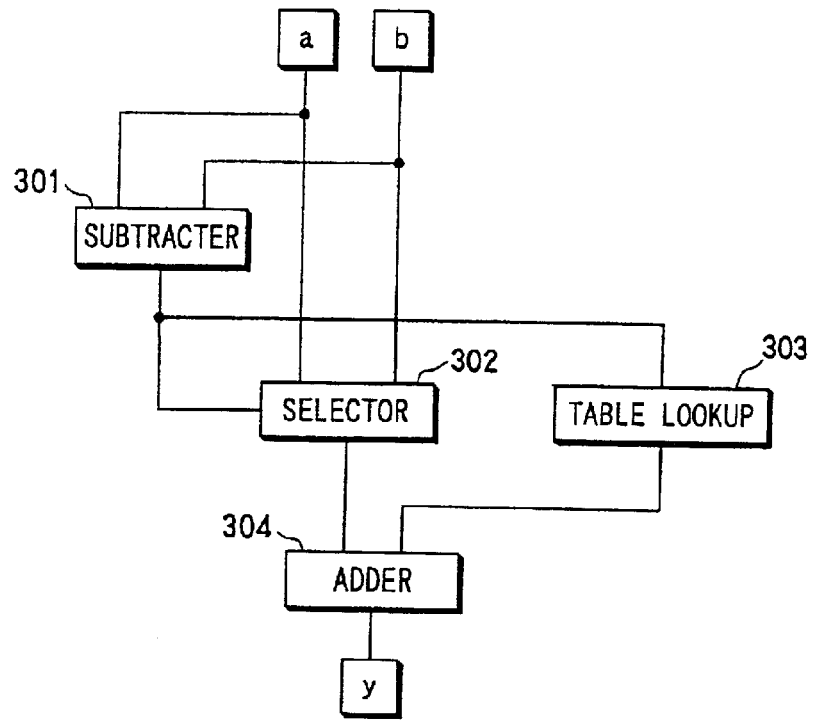
FIG. 10 is a block diagram showing a calculator for calculating the value of a non-linear function "max (a, b)+log $(1+e^{-|a-b|})$" by using a lookup table that includes values of log $(1+e^{-|a-b|})$ at sampling points.
Figure 11:
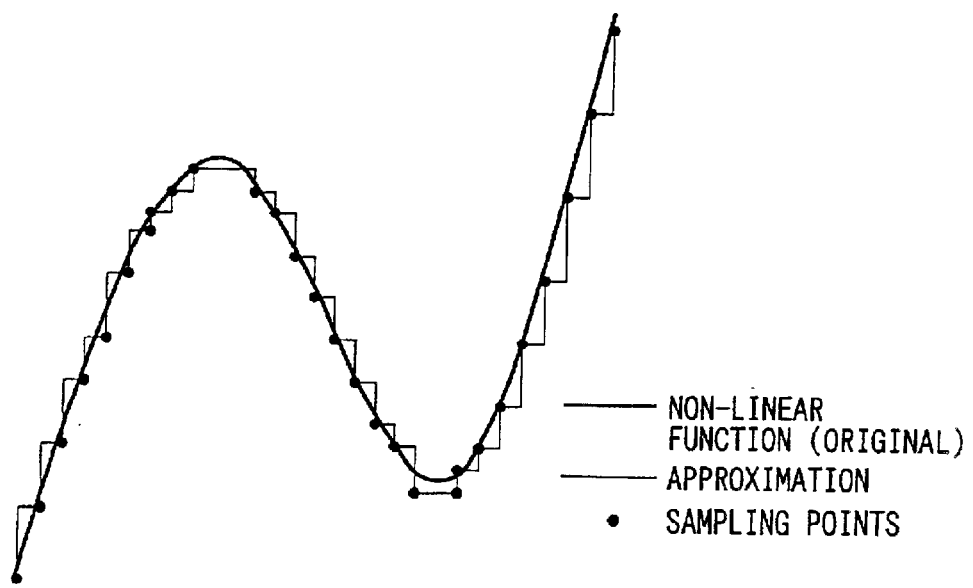
FIG. 11 is graph representation showing how an approximate value of a non-linear function is obtained from values stored in a lookup table.

A calculator according to a second embodiment of the present invention receives input data a and b, and calculates an approximate value of a formula "max (a, b)+log (1+e$^{-|a-b|}$)". This calculator is incorporated in a MAP decoder. The MAP decoder is incorporated in a turbo decoder shown in FIG. 7 as a soft-output decoder 101, 102 as described above, and implemented by software that includes the process shown in FIG. 8 or hardware shown in FIG. 9. The calculator according to the present embodiment is used for calculating the probabilities α and β at steps 203 and 204 utilizing log-BCJR algorithm as described above, when the MAP decoder is implemented by software.

In order to obtain the probabilities α and β, putting α$_1$·γ$_1$=e$^a$ and α$_2$·γ$_2$=e$^b$ or β$_1$·γ$_3$=e$^a$ and β$_2$·γ$_4$=e$^b$, a value of log (e$^a$+e$^b$) should be calculated. Log (e$^a$+e$^b$) is represented by a formula "max (a, b)+log (1+e$^{-|a-b|}$)", and the calculator according to the present embodiment calculates an approximate value of the formula as follows.

Figure 4:
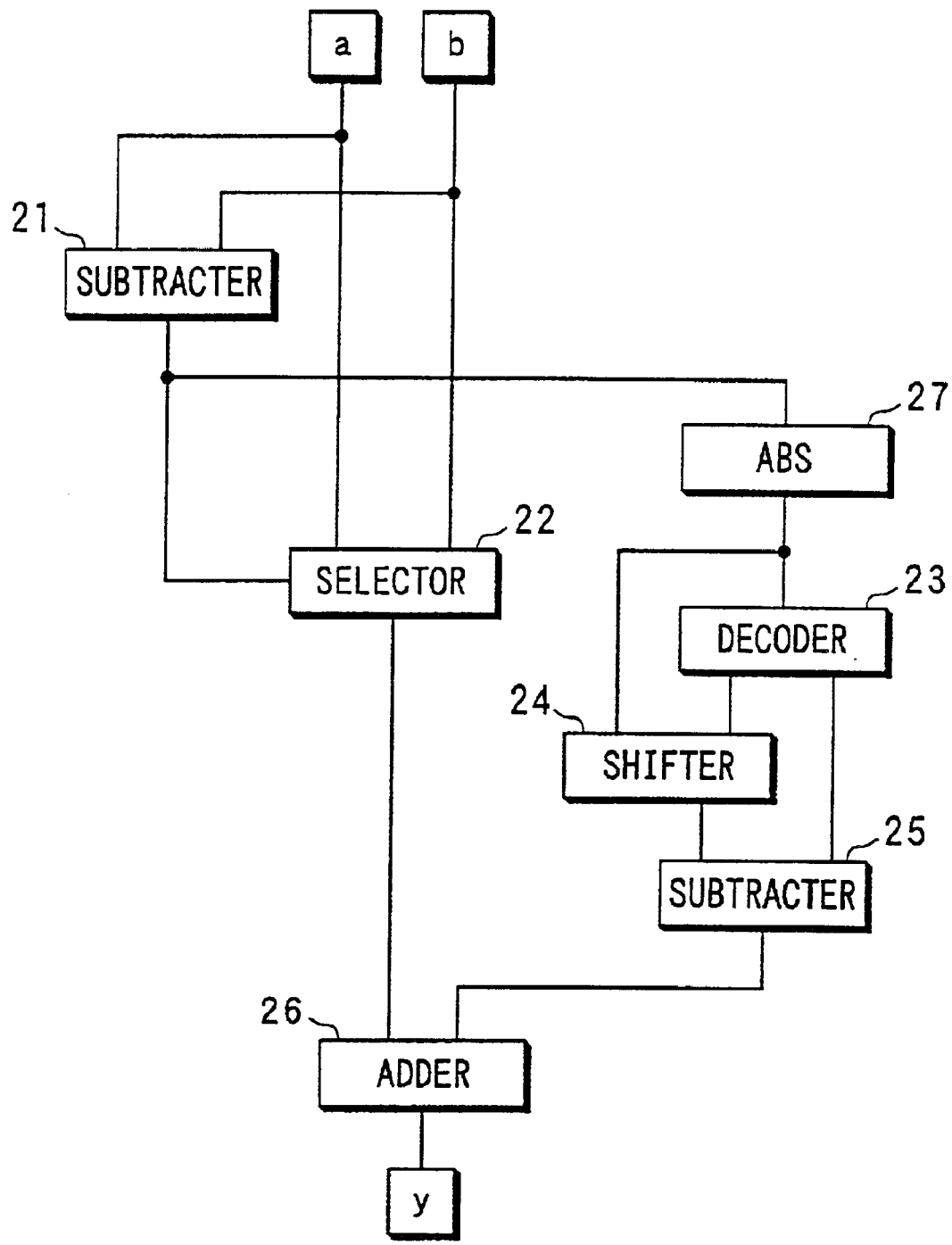
FIG. 4 is a block diagram showing an approximate calculator according to a second embodiment of the present invention.

Referring to FIG. 4, digital input data a and b is inputted to a first subtracter 21. The first subtracter 21 outputs the difference (a−b) between the input data a and b to a selector 22 and to an absolute value circuit 27. The selector 22 further receives the input data a and b, and selects larger one max (a, b) of the input data a and b based on the sign of the difference (a−b). The selector 22 outputs the selected large one max (a, b) to an adder 26. The absolute value circuit 27 outputs the absolute value |a−b| of the difference (a−b).

Putting |a−b|=X, log (1+e$^{-|a-b|}$) is represented as log (1+e$^{-X}$). Therefore a decoder 23, a shifter 24 and a second subtracter 25 can together generate a value of log (1+e$^{-|a-b|}$) similarly to the first embodiment. Specifically, the decoder 23 receives the absolute value |a−b| of the difference (a−b), and retrieves, from a lookup table, m-bit data (m is a natural number) which represents a value corresponding to the slope A=−2$^n$ of the straight line that interpolates an interval that includes the value of |a−b| as an X-value. Further the decoder 23 retrieves, from the lookup table, intercept data that represents the Y-intercept B of the straight line. The decoder 23 outputs the m-bit data to the shifter 24, and the intercept data to the second subtracter 25.

The shifter 24 also receives the absolute value |a−b| of the difference (a−b), and shifts it by |n| bits based on the sign and value of the m-bit data. The shifter 24 outputs the resultant value as first term data of an approximate value of log (1+e$^{-|a-b|}$) to the second subtracter 25. The second subtracter 25 subtracts the value of the first term data from the Y-intercept B, and outputs the resultant value to the adder 26 as the approximate value of log (1+e$^{-|a-b|}$) The adder 26 generates the sum of the value of the larger one max (a, b) of the input data a, b and the approximate value of log (1+e$^{-|a-b|}$), and outputs the generated sum as an approximate value y of the formula "max (a, b)+log (1+e$^{-|a-b|}$)".

(Modifications)

Figure 5:
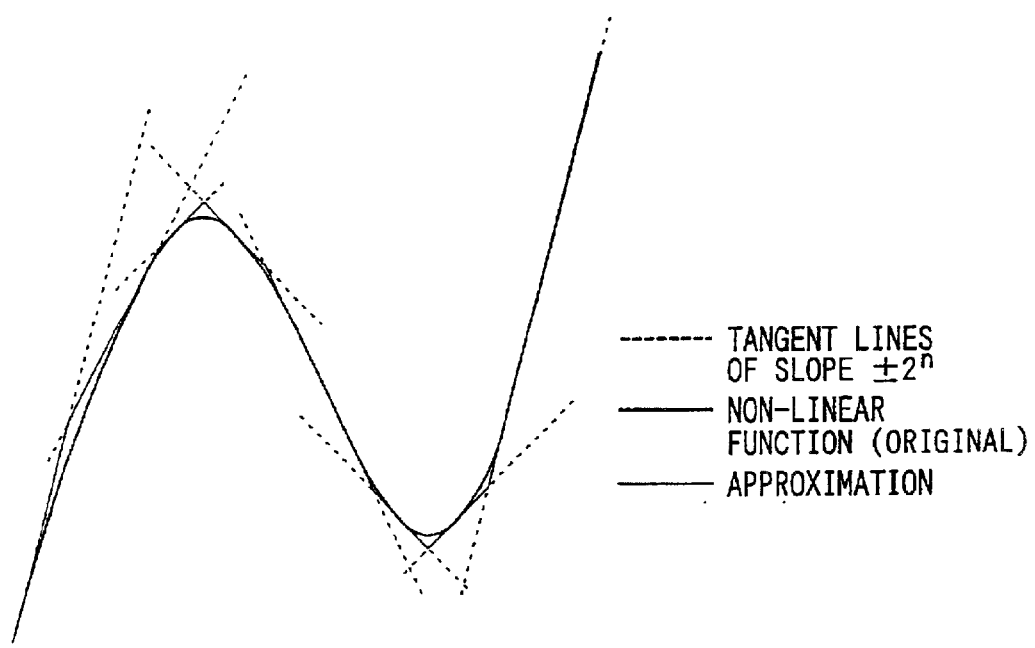
FIG. 5 is graph representation showing how a non-linear function is linear-interpolated according to a modification of the first embodiment.

In the first embodiment, the non-linear function may be linear-interpolated as shown in FIG. 5. That is, points on which a tangent line has a slope of ±2$^n$ (n is an integer) are selected as sampling points. Specifically, the non-linear function is differentiated, and points on which the value of the derivative of the non-linear function is ±2$^n$ (4, 2, 1, 0.5, 0.25 or the like) are selected as the sampling points.

Figure 6:
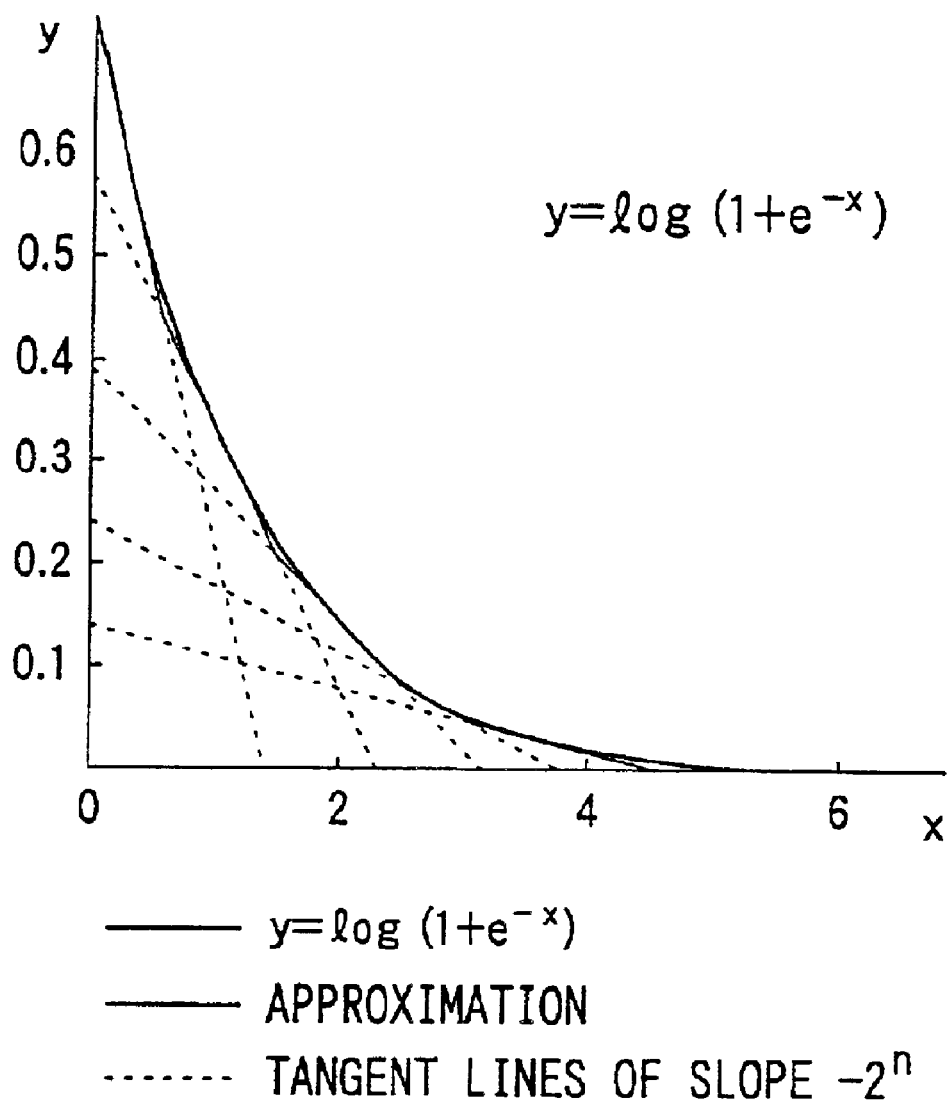
FIG. 6 is graph representation showing how the non-linear function Y=log $(1+e^{-x})$ is linear-interpolated according to the modification of the first embodiment.

The entire non-linear function is interpolated by a polygonal line that includes segments of the respective tangent lines and further includes as vertices the intersections corresponding to the respective pairs of the adjacent tangent lines. According to the present modification, the non-linear function Y=log (1+e$^{-x}$) is interpolated by tangent lines whose slopes are −0.5, −0.25, −0.125, −0.0625, −0.03125 and the like as shown in FIG. 6.

The calculator according to the above embodiments may be used for other cases in which a value of a non-linear function should be calculated. For example, the calculator may be used for calculating the information symbol likelihood λ at step 205 of FIG. 8, if necessary.

What is claimed is:

1. An approximate calculator for calculating an approximate value of a non-linear function log (e$^a$+e$^b$) using input data a and b, comprising:

selector means for selecting larger one max (a, b) from said input data a and b;

decoder means for outputting m-bit data (m is a natural number) that represents a value corresponding to a slope of a coordinate straight line and outputting intercept data of said coordinate straight line based on an absolute value |a−b| of difference (a−b) of said input data a and b, said coordinate straight line interpolating a non-linear function Y=log (1+e$^{-x}$) for an interval that includes said absolute value |a−b| as an X-value and having a slope of 2$^n$ (n is an integer), said intercept data representing Y-intercept of said coordinate straight line;

shifter means for shifting said absolute value |a−b| by |n| bits based on said m-bit data and outputting resultant data as first term data of an approximate value of a non-linear function log (1+e$^{-|a-b|}$);

approximation output means for generating and outputting said approximate value of said non-linear function log (1+e$^{-|a-b|}$) based on said first term data and said intercept data; and adder means for generating sum of a value of said larger one max (a, b) of said input data a and b and said approximate value of said non-linear function log (1+e$^{-|a-b|}$) and outputting the generated sum as said approximate value of said non-linear function log (e$^a$+e$^b$).

2. An approximate calculator as in claim 1, further comprising:
   subtracter means for generating and outputting said difference (a−b) of said input data a and b,
   wherein said selector means receives said difference (a−b) from said subtracter, and uses said received difference (a−b) for selecting said larger one max(a, b) of said input data a and b,
   wherein said decoder means receives said difference (a−b) from said subtracter, and derives said absolute value |a−b| from said received difference (a−b), and
   wherein said shifter means receives said difference (a−b) from said subtracter, and derives said absolute value |a−b| from said received difference (a−b).

3. A MAP decoder for performing MAP decoding utilizing log-BCJR algorithm, comprising:
   selector means for receiving input data a and b and selecting larger one max (a, b) from said input data a and b;
   decoder means for outputting m-bit data (m is a natural number) that represents a value corresponding to a slope of a coordinate straight line and outputting intercept data of said coordinate straight line based on an absolute value |a−b| of difference (a−b) of said input data a and b, said coordinate straight line interpolating a non-linear function Y=log (1+$e^{-x}$) for an interval that includes said absolute value |a−b| as an X-value and having a slope of $2^n$ (n is an integer), said intercept data representing Y-intercept of said coordinate straight line;
   shifter means for shifting said absolute value |a−b| by |n| bits based on said m-bit data and outputting resultant data as first term data of an approximate value of a non-linear function log (1+$e^{-|a-b|}$);
   approximation output means for generating and outputting said approximate value of said non-linear function log (1+$e^{-|a-b|}$) based on said first term data and said intercept data; and
   adder means for generating sum of a value of said larger one max (a, b) of said input data a and b and said approximate value of said non-linear function log (1+$e^{-|a-b|}$) and outputting the generated sum as an approximate value of said non-linear function log ($e^a+e^b$),
   wherein said approximate value of said non-linear function log ($e^a+e^b$) is used for calculating state probability by forward iterations and for calculating state probability by backward iterations.

4. A MAP decoder as in claim 3, further comprising:
   subtracter means for generating and outputting said difference (a−b) of said input data a and b,
   wherein said selector means receives said difference (a−b) from said subtracter, and uses said received difference (a−b) for selecting said larger one max(a, b) of said input data a and b,
   wherein said decoder means receives said difference (a−b) from said subtracter, and drives said absolute value |a−b| from said received difference (a−b), and
   wherein said shifter means receives said difference (a−b) from said subtracter, and drives said absolute value |a−b| from said received difference (a−b).

5. A method for calculating an approximate value of a non-linear function log ($e^a+e^b$) using input data a and b, comprising the steps of:
   selecting larger one max (a, b) from said input data a and b;
   retrieving m-bit data (m is a natural number) that represents a value corresponding to a slope of a coordinate straight line based on an absolute value |a−b| of difference (a−b) of said input data a and b, said coordinate straight line interpolating a non-linear function Y=log (1+$e^{-x}$) for an interval that includes said absolute value |a−b| as an X-value and having a slope of $2^n$ (n is an integer)
   retrieving intercept data of said coordinate straight line based on said absolute value |a−b| of said difference (a−b) of said input data a and b, said intercept data representing Y-intercept of said coordinate straight line;
   shifting said absolute value |a−b| by |n| bits based on said m-bit data and providing resultant data as first term data of an approximate value of a non-linear function log (1+$e^{-|a-b|}$);
   generating said approximate value of said non-linear function log (1+$e^{-|a-b|}$) based on said first term data and said intercept data; and
   generating sum of a value of said larger one max (a, b) of said input data a and b and said approximate value of said non-linear function log (1+$e^{-|a-b|}$) and providing the generated sum as said approximate value of said non-linear function log ($e^a+e^b$).

6. A method for performing MAP decoding utilizing log-BCJR algorithm, comprising the steps of:
   receiving input data a and b;
   selecting larger one max (a, b) from said input data a and b;
   retrieving m-bit data (m is a natural number) that represents a value corresponding to a slope of a coordinate straight line based on an absolute value |a−b| of difference (a−b) of said input data a and b, said coordinate straight line interpolating a non-linear function Y=log (1+$e^{-x}$) for an interval that includes said absolute value |a−b| as an X-value and having a slope of $2^n$ (n is an integer);
   retrieving intercept data of said coordinate straight line based on said absolute value |a−b| of said difference (a−b) of said input data a and b, said intercept data representing Y-intercept of said coordinate straight line;
   shifting said absolute value |a−b| by |n| bits based on said m-bit data and providing resultant data as first term data of an approximate value of said non-linear function log (1+$e^{-|a-b|}$);
   generating said approximate value of said non-linear function log (1+$e^{-|a-b|}$) based on said first term data and said intercept data; and
   generating sum of a value of said larger one max (a, b) of said input data a and b and said approximate value of said non-linear function log (1+$e^{-|a-b|}$) and providing the generated sum as an approximate value of a non-linear function log ($e^a+e^b$),
   wherein said approximate value of said non-linear function log ($e^a+e^b$) is used for calculating state probability by forward iterations and for calculating state probability by backward iterations.

* * * * *